United States Patent
Lagakos et al.

(10) Patent No.: US 6,998,599 B2
(45) Date of Patent: Feb. 14, 2006

(54) INTENSITY MODULATED FIBER OPTIC MICROBEND ACCELEROMETER

(75) Inventors: Nicholas Lagakos, Silver Spring, MD (US); Joseph Bucaro, Herndon, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 109 days.

(21) Appl. No.: 10/446,258

(22) Filed: May 28, 2003

(65) Prior Publication Data

US 2004/0099800 A1    May 27, 2004

Related U.S. Application Data

(60) Provisional application No. 60/383,577, filed on May 28, 2002.

(51) Int. Cl.
  *G01J 1/04*   (2006.01)
  *G01J 1/42*   (2006.01)
  *G01J 5/08*   (2006.01)

(52) U.S. Cl. .................................. 250/227.16; 385/13
(58) Field of Classification Search .......... 250/227.16, 250/227.14, 227.11, 239; 385/12, 13; 73/514.26
  See application file for complete search history.

(56) References Cited

U.S. PATENT DOCUMENTS

| 4,162,397 A | 7/1979 | Bucaro et al. |
| 4,238,856 A | 12/1980 | Bucaro et al. |
| 4,363,114 A | 12/1982 | Bucaro et al. |
| 4,427,263 A | 1/1984 | Lagakos et al. |
| 4,482,205 A | 11/1984 | Lagakos et al. |
| 4,621,896 A | 11/1986 | Lagakos et al. |
| 4,800,267 A * | 1/1989 | Freal et al. ............ 250/227.16 |
| 4,930,862 A * | 6/1990 | Miers et al. ............ 250/227.16 |
| 4,979,798 A | 12/1990 | Lagakos et al. |
| 4,994,668 A | 2/1991 | Lagakos et al. |
| 5,367,376 A | 11/1994 | Lagakos et al. |

(Continued)

OTHER PUBLICATIONS

J.A. Bucaro and N. Lagakos, "Fiber Optics Pressure and Acceleration Sensors", Proceeding of the 47th International Instrument symposium, Denver, CO (May 6-10, 2001).

(Continued)

*Primary Examiner*—Seung C. Sohn
(74) *Attorney, Agent, or Firm*—Sally A. Ferrett; John J. Karasek

(57) ABSTRACT

A microbend accelerometer comprising a housing having a housing base and a housing top, where housing base has corrugations that protrude from the surface of the housing and an internal mass assembly located between the housing top and the side of the housing base. The internal mass assembly features corrugations that are similar to the housing base corrugations. The microbend accelerometer also features a sensing fiber featuring light propagating therethrough, said sensing fiber disposed between said internal mass and said housing base, said sensing fiber being coupled on each end to at least one lead fiber. Upon an acceleration event along a predetermined axis, inertia causes the internal mass assembly to apply a force on the sensing fiber causing the sensing fiber to distort. This resulting distortion of the sensing fiber causes the intensity of the light propagating through the sensing fiber to modulate in proportion to the magnitude of said acceleration event. The light modulated in the sensing fiber propagates into the lead fiber couple thereto where the modulation is sensed by sensing means coupled to the lead fiber.

8 Claims, 3 Drawing Sheets

U.S. PATENT DOCUMENTS

| | | | |
|---|---|---|---|
| 5,633,960 | A | 5/1997 | Lagakos et al. |
| 5,805,753 | A | 9/1998 | Lagakos et al. |
| 5,825,489 | A | 10/1998 | Lagakos et al. |
| 6,462,445 | B1 | 10/2002 | Weber et al. |
| 6,717,337 | B1 | 4/2004 | Howarth et al. |
| 2002/0176592 | A1 | 11/2002 | Howarth et al. |
| 2004/0151417 | A1 | 8/2004 | Lagakos et al. |

OTHER PUBLICATIONS

J.A. Bucaro and N. Lagakos, "Lightweight Fiber Optics Microphones and Accelerometers," Review of Scientific Instruments, vol. 72, pp. 2816-2821 (Jun. 2001).

D.R. Miers, D. Raj, and J.W. Berthold, "Design and Characterization of Fiber-Optic Accelerometers," Proc. Fiber Optic Laser Sensor V, SPIE vol. 838, pp. 314-317 (1987).

A.J. Zuckerman, F.W. Cuomo, T.D. Nguyen, S.A. Rizzi, S.A. Clevenson, "High Temperature Fiber-Optic Lever Microphones," J. Acoustical Society of America, 97 (6) p 3605-16 (Jun. 1995).

J.A. Bucaro, B.H. Houston, T.R. Howarth, R. Corsaro, J. Tressler, and N. Lagakos, Progress toward a "smart acoustic blanket," J. Acoustical Society of America, 107 p 2852 (May 2000). (Abstract).

D.A. Krohn, Fiber Optic Sensors—Fundamentals and Applications (Instrument Society of America, Research Triangle Park, NC), Chapters 3 and 8, (1992).

N. Lagakos, J.H. Cole, and J.A. Bucaro, "Microbend Fiber-optic Sensor," Applied Optics 26, p 2171-2180 (Jun. 1987).

G. He and F.W. Cuomo, "Displacement Response, Detection Limit, and Dynamic Range of Fiber Optic Level Sensors," J. Lightwave Tech., vol. 9, No. 11, p 1618-1625 (Nov. 1991).

A. Hu, F.W. Cuomo, J. Zuckerwar, "Theoretical and Experimental Study of a Fiber Optic Microphone," J. Acoustical Society of America, 91, p 3049-60, (1992).

* cited by examiner

INTENSITY MODULATED FIBER OPTIC MICROBEND ACCELEROMETER

The present application claims the benefit of the priority filing date of provisional application No. 60/383,577 filed on 28 May, 2002, hereby incorporated, in its entirety, by reference.

FIELD OF THE INVENTION

This invention relates in general to the field of accelerometers and in particular to the field of fiber optic microbend accelerometers.

BACKGROUND

Active sound control systems often require, in addition to actuator and electronic control components, specialized sensor devices. The requirements associated with such sensors to a large part are determined by the particular active control approach employed, as well as the kind of performance expected of the sound controlling system. One type of sensor is the accelerometer, which measures the acceleration of a system, body or surface along one or more axis of acceleration.

These sensors are often used as components of instrumentation packages employed on missiles, satellites or other rocket payloads, aircraft or other mechanisms in which acceleration or vibration can be quite severe. When in employed in such environments, weight becomes a critical variable. A 10 gram weight differential at rest becomes a 150 gram weight difference during a 15 G acceleration event.

While various electro magnetic accelerometers offer high levels of sensitivity and good performance in terms of size and efficiency, these electromagnetic devices are often very sensitive to EMI and aren't always physically robust. The hardening of these devices to EMI almost invariably causes an increase in physical size, weight, sensitivity and expense.

One solution is to employ accelerometers which are not electrical or semiconductors in nature. The use of fiber optics for sensors in general, and for accelerometers in particular, are one option available to designers which simultaneously solves the EMI sensitivity, size and weight problems inherent in electrical sensors.

Since fiber optics use light rather than electricity, a fiber optic accelerometer is generally insensitive to EMI or EMF and are therefore more efficient in environments which have large amounts of electro magnetic energy. Therefore fiber optic accelerometers can be located adjacent to or actually attached to electronic devices which generate large electro magnetic fields without negative affects to either the accelerometer or the body of interest.

In "Design and Characterization of Fiber-Optic Accelerometers". SPIE Volume 838, Fiber Optic and Laser Sensor V (1987), Miers, Ral, and Berthold disclose a microbend accelerometer having a fiber loop clamped between the two sets of corrugations. The Miers device also includes a second reference loop in the sensor element for the purpose of offsetting any spurious signals that are developed in the fiber-optic cable.

Therefore it is an object of this invention to offer an accelerometer device that is small and light weight.

It is yet a further object to offer an accelerometer that is EMI insensitive.

It is a further object of this invention to offer an accelerometer that features high levels of sensitivity.

It is a yet another object offer an accelerometer that is physical robust.

It is a further object of this invention to offer an accelerometer that is economical.

SUMMARY

A microbend accelerometer comprising a housing having a housing base and a housing top, where housing base has corrugations that protrude from the surface of the housing and an internal mass assembly located between the housing top and the side of the housing base. The internal mass assembly features corrugations that are similar to the housing base corrugations. The microbend accelerometer also features a sensing fiber featuring light propagating therethrough, said sensing fiber disposed between said internal mass and said housing base, said sensing fiber being coupled on each end to at least one lead fiber. Upon an acceleration event along a predetermined axis, inertia causes the internal mass assembly to apply a force on the sensing fiber causing the sensing fiber to distort. This resulting distortion of the sensing fiber causes the intensity of the light propagating through the sensing fiber to modulate in proportion to the magnitude of said acceleration event. The light modulated in the sensing fiber propagates into the lead fiber couple thereto where the modulation is sensed by sensing means coupled to the lead fiber.

DETAILED DESCRIPTION

Figure 1:
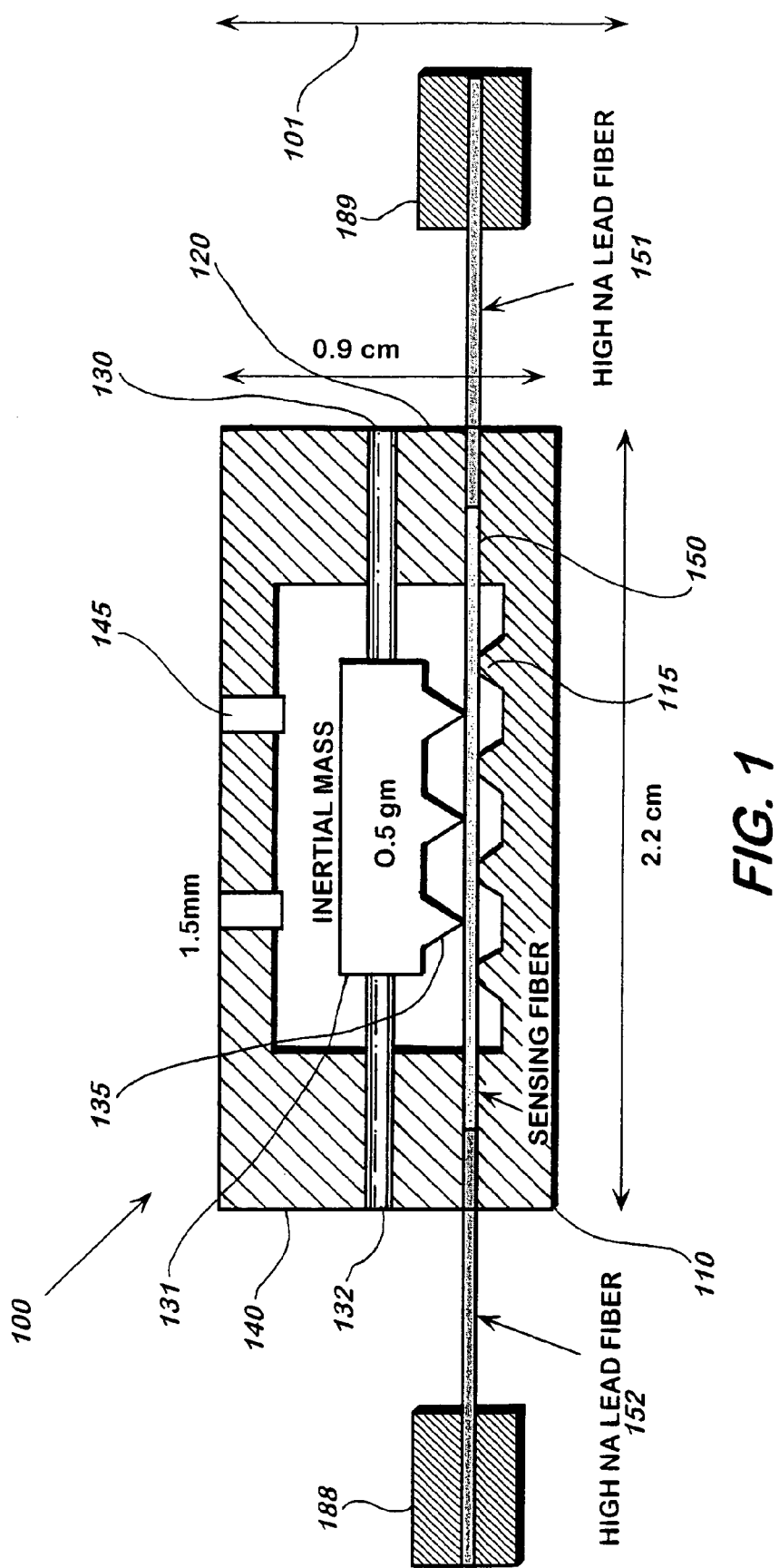
FIG. 1 shows a fiber optic microbend accelerometer.

Referring now to the pictures where like numbers denote like elements, FIG. 1 shows an example embodiment of a fiber optic microbend accelerometer 100.

In the example embodiment shown in FIG. 1, the microbend accelerometer features a housing 100 having a housing base 110 and a housing top 140. The housing base 110 has at least one corrugation 115 that protrudes from one or more surface of the housing base. Within the housing base, internal mass assembly 130 is positioned between the housing top 140 and the side of the housing base 110 that features the corrugations. The internal mass assembly includes the internal mass and a mounting plate. The internal mass assembly is rigidly coupled to the housing base in such a manner to allow motion only along the particular axis of interest. Sensing fiber 150 is located between the internal mass assembly 130 and housing base 110. The sensing fiber 150 is operatively coupled on each end to a lead fiber 151 and 152. The lead fibers 151 and 152 each have a higher numerical aperture value than sensing fiber 150. The first lead fiber 152 is coupled to a means for launching light 188 into the accelerometer. In the preferred embodiment this means for launching light in to the accelerometer is a laser diode, however one will appreciate that the means for charging the lead fiber and subsequently the accelerometer is not limiting to the invention.

In operation, light launched into the first lead fiber 152, propagates through the first lead fiber 152 and is launched into the sensing fiber 150 coupled thereto. The light propagates through the sensing fiber 150 and is launched into said second lead fiber 151.

Figure 2:
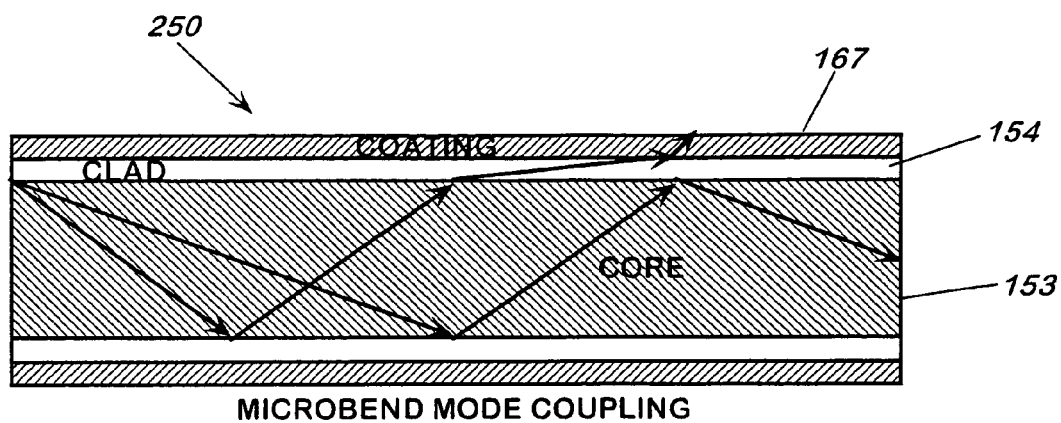
FIG. 2 shows the microbend coupling in the sensing fiber of a microbend accelerometer.

FIG. 2 shows the microbend coupling in the sensing fiber 150 of a microbend accelerometer. The sensing fiber contains a core 153, a clad 154 and a coating 167. Light energy propogating through the fiber is represented in the figure as arrows. When the sensing fiber is distorts, some of the light propagating therethough escapes from the core 153. This changes the efficiency at which the sensing fiber transmits light as the light energy that escapes the fiber core 153 is lost.

Referring again to FIG. 1 upon an acceleration event along a predetermined axis 101 having a particular orientation with accelerometer 100, the inertia resulting from the acceleration event causes internal mass assembly 130 to exert a force on the sensing fiber 150 coupled thereto. The resulting force causes sensing fiber 150 to bend or distort. A result of this distortion of the sensing fiber is a change in the efficiency at which the sensing fiber transmits the light, thus altering the intensity of the light propagating therethrough. The change in the fibers transmission efficiency causes the light propagating through the sensing fiber to attenuate in proportion to the magnitude of said acceleration event. This modulated light is then launched into lead fiber 151. The attenuated light can then be detected by a detection means and the change in the intensity of the light emerging from the sensing fiber may be compared to the light launched into the lead fiber 150. The degree of change in the attenuate light may be related to the magnitude of the acceleration event through some known relation.

The internal mass assembly 130 features at least one corrugation and also includes one inertial mass 131 and a mounting plate 132. The inertial mass 131 is attached to the mounting plate 132, and the mounting plate features means to attach the internal mass assembly 130 to the housing base 110 in such a manner as to facilitate flexibility along the predetermined axis of acceleration while maintaining a rigid structure along the other axis.

In a preferred embodiment the mounting plate is attached to the housing base by mounting means located along the perimeter of the mounting plate. This feature of attaching the mounting plate to the housing base along the perimeter allows one more accurate management of the motion of the internal mass by providing a more rigid structure. The increased rigidity provides greater sensitivity to an acceleration event thus producing increased accuracy in the subsequent measurement of the acceleration event.

With continued reference to FIG. 1, in the example embodiment the internal mass assembly 130 features corrugations 135 or teeth. The teeth are disposed adjacent too the housing base through an opening in the spacer plate 120. The internal mass assembly teeth, are aligned with the at least one tooth of said housing base 115, wherein said at least one tooth of said internal mass assembly and said at least one tooth of said housing base couple to contact said sensing fiber uniformly.

Figure 3:
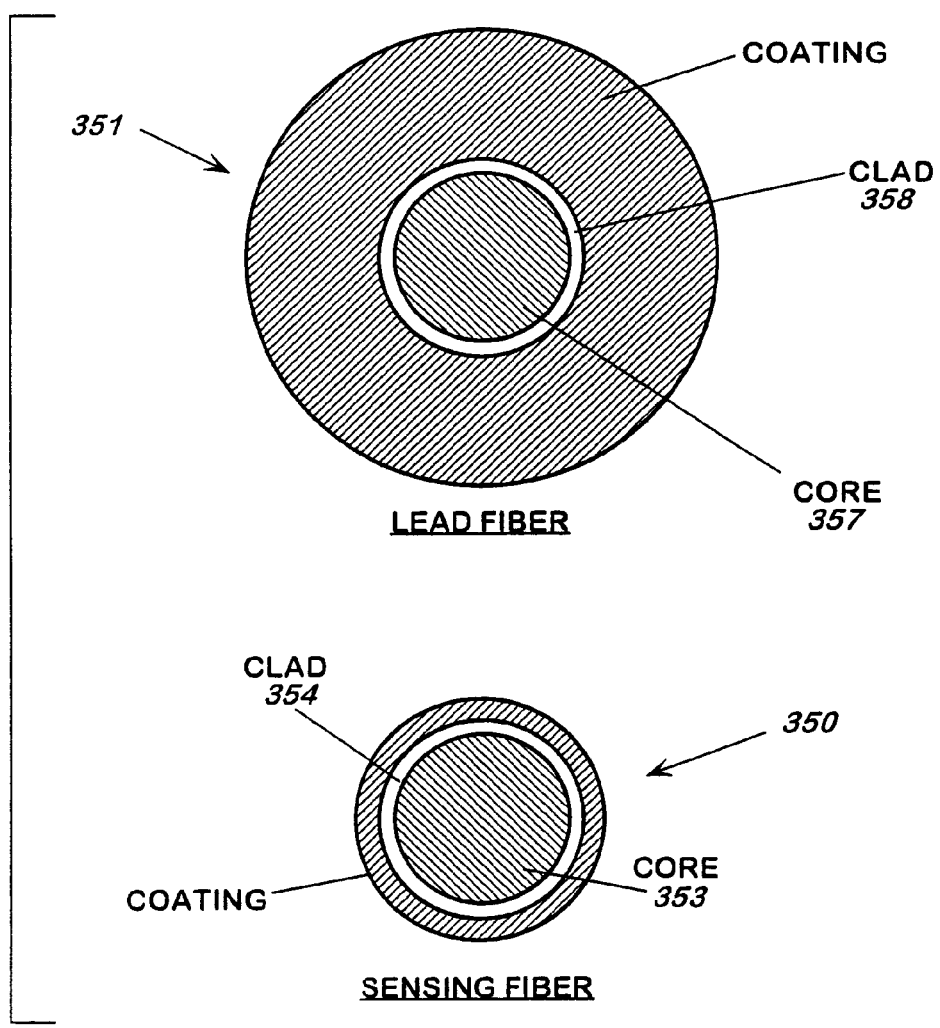
FIG. 3 shows the front view of a multi-mode lead fiber and the front view of a multi-mode sensing fiber.

FIG. 3 shows a front view of the sensing fiber 350 and a front view of one of the lead fibers 351. The sensing fiber 350 is preferably a multimode optical fiber having a structure with a glass core 353 and clad 354. The sensing fibers structure preferably features a core and a clad, where the core 353 is substantially thicker than the clad 354. In the preferred embodiment the sensing fiber features a numerical aperture less than the numerical aperture of the lead fibers, but both preferably have the same core diameter. This minimizes the amount of light energy lost as the light propagates through the lead fibers and allows the first lead fiber to deliver to the sensing fiber the maximum amount of light that can propagate through the sensing fiber and minimizes the lead noise of the sensor.

Figure 4:
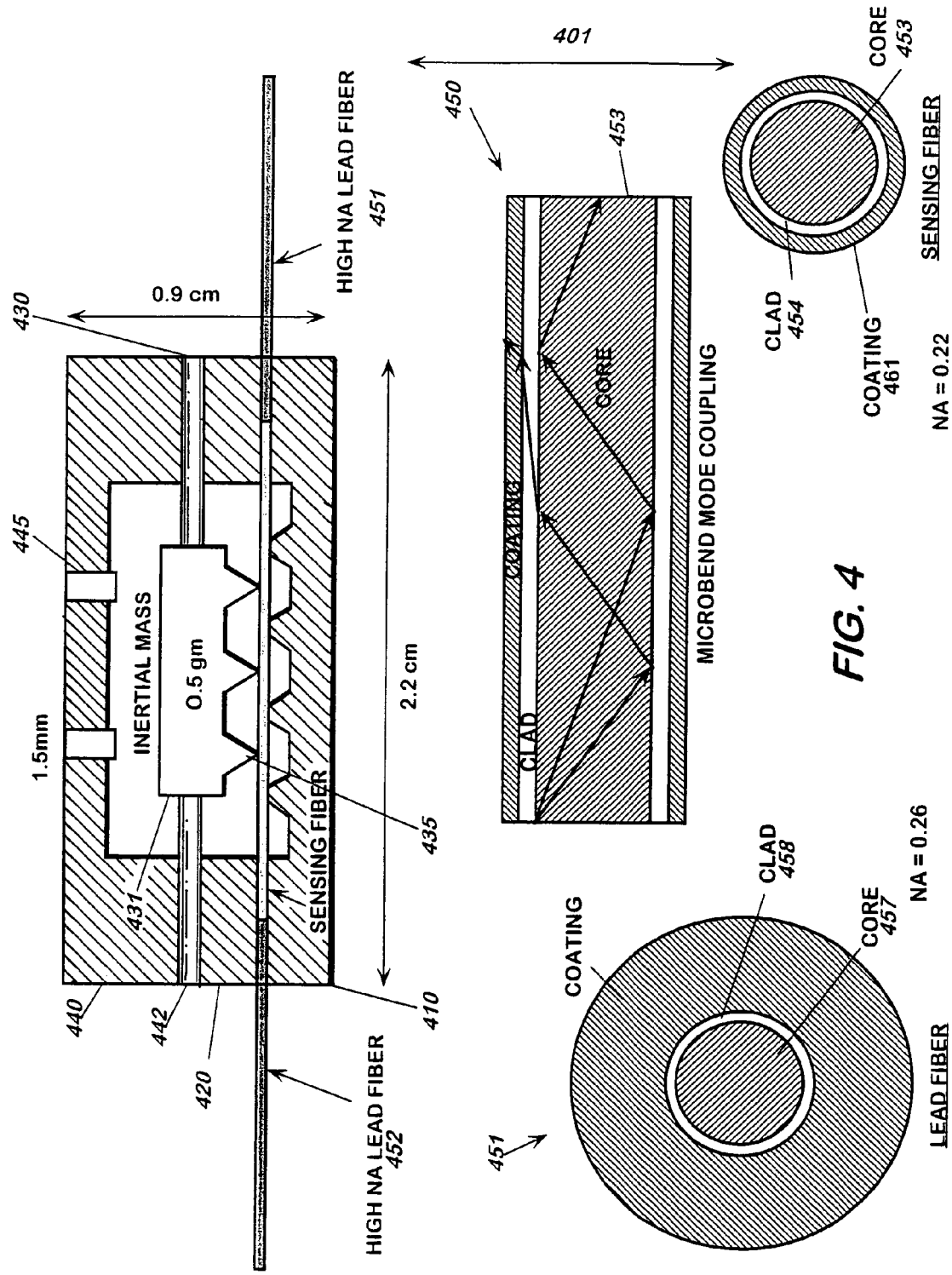
FIG. 4 shows and example embodiment of the fiber optic microbend accelerometer employed in a system for detecting the acceleration of a body.

The design of the light-weight microbend accelerometer employing the structure of FIG. 1 is shown in the example embodiment of FIG. 4. The (housing) casing is made from noryl, and the inertial mass 430 is a 0.5 g brass piece glued at its center of gravity to a 0.5 mm vinyl plate. The use of a plate mount which could be attached at all four edges is critical for achieving sufficiently low sensitivity to lateral acceleration. As can be seen in FIG. 4 the accelerometer has four parts: the base 410, the spacer 420, the inertial mass 430, and the top 440. The inertial mass 430 has three teeth 435 separated by 3.047 mm which are carefully aligned with respect to the four teeth 415 of the base 410. The teeth of the inertial mass 430 and the base 415 are sanded so that they contact the sensing fiber uniformly.

With continued reference to FIG. 4, the critical steps in designing a microbend are choice of fiber, and the special periodicity of the deformer teeth, and the displacement bias. The example embodiment of FIG. 4 employs a commercially available fiber having a 200 micrometer (outside diameter) glass core 453, a 220 micrometer (outside diameter) class clad 454, a 260 micrometer (outside diameter) aluminum coating 461, and a numerical aperture approaching 0.22 as the sensing fiber 450. The numerical aperture is defined as the product of the optical index and the sine of the acceptance angle. The core size chose is a compromise between efficient light coupling (large core) and cost (small core). The thin cladding and coating thickness are important for achieving a relatively low fiber bending stiffness. The coating is constructed of aluminum. Other coatings such as plastic may be employed, however an aluminum coating provides the additional benefit of reducing fiber creep. The addition cost of the metal coating is not important given the shorts lengths (<2 cm) used for the sensing fiber 450. The numerical aperture is chosen to be significantly less than that of the lead fibers 415 consistent with the different functions of these two fibers. The optimum deformer spatial periodicity, the distance between successive deformer teeth, is determined by the physical and optical characteristics of the sensing fiber such as the maximum microbend loss for a given periodicity.

The optimum deformer spatial bias may be determined using a combination of a statically applier micrometer displacement and a dynamically produced displacement by means of a piezoelectric transducer. In the example embodiment one may used a PIN photodiode to charge the accelerometer with light energy. The base 410, spacer 420, vinyl plate portion 442 of the internal mass assembly 430 and the sensor top 440 are held together with four small nylon screws. Two holes 445 were placed completely through the sensor top 440 to provide dynamic pressure equilibration.

Upon an acceleration event along a predetermined axis 401 having a particular orientation with accelerometer 400, the inertia resulting from the acceleration event causes internal mass assembly 430 to exert a force on the sensing fiber 450 coupled thereto. The resulting force causes sensing fiber 450 to bend or distort. FIG. 2 shows an example of this type of microbend mode coupling. A result of this distortion of the sensing fiber is a change in the efficiency at which the sensing fiber transmits the light, thus altering the intensity of the light propagating therethrough. The change in the fibers transmission efficiency causes the light propagating through the sensing fiber to attenuate in proportion to the magnitude of said acceleration event. This modulated light is then launched into lead fiber 451. The attenuated light can then be detected by a detection means and the change in the intensity of the light emerging from the sensing fiber may be compared to the light launched into the lead fiber 450.

Although this invention has been described in relation to the exemplary embodiment's thereof, it is well understood by those skilled in the art that other variations and modifications can be affected on the preferred embodiment without departing from scope and spirit of the invention as set fourth in the claims.

The invention claimed is:

1. A microbend accelerometer comprising:
    a housing having a housing base and a housing top, said housing base having at least one corrugation that protrudes from at least one surface,
    a mass assembly disposed between said housing top and the side of the housing base that features said at least one corrugation,
    a sensing fiber disposed between said mass assembly and said housing base, said sensing fiber being coupled on each end to a lead fiber, said lead fiber having a higher numerical aperture than said sensing fiber, wherein light propagates through the first of said lead fibers and is launched into said sensing fiber, propagates therethrough and is launched into a second of said lead fibers,
    wherein upon an acceleration event along a predetermined axis, said mass assembly coupled to said sensing fiber distorts said sensing fiber causing the intensity of said light propagating through said sensing fiber to modulate in proportion to the magnitude of said acceleration event.

2. The microbend accelerometer of claim 1, wherein said mass assembly comprises a mass and a mounting plate, said mass being attached to said mounting plate in a manner allowing flexibility along the predetermined axis of acceleration while maintaining a rigid structure along another axis.

3. The microbend accelerometer of claim 2 wherein said mass is attached to the mounting plate on a perimeter of said mounting plate.

4. The microbend accelerometer of claim 2, wherein said mass assembly comprises at least one tooth, said at least one tooth being disposed adjacent to said housing base.

5. The microbend accelerometer of claim 4, wherein said at least one mass assembly tooth is aligned with said at least one tooth of said housing base, wherein said at least one tooth of said mass assembly and said at least one tooth of said housing base couple to contact said sensing fiber uniformly.

6. The microbend accelerometer of claim 5, wherein said sensing fiber comprises a core and a clad, said core being substantially thicker than said clad.

7. The microbend accelerometer of claim 1, wherein said sensing fiber is a multimode fiber.

8. A microbend accelerometer comprising:
    a housing having at least one corrugation that protrudes from at least one surface of the housing,
    an inertial mass arranged movably with respect to the housing, the inertial mass assembly having at least one one corrugation facing the surface of the housing having the corrugation,
    a sensing fiber, at least a portion of the sensing fiber disposed between the corrugations of the inertial mass assembly and the housing, said sensing fiber being optically coupled on one end to a lead fiber, said lead fiber having a higher numerical aperture than said sensing fiber, arranged for light to be transmitted from the lead fiber and into the sensing fiber,
    wherein an acceleration of the inertial mass assembly distorts said sensing fiber causing an attenuation of the intensity of said light transmitted through said sensing fiber.

* * * * *